United States Patent [19]
Khalemsky et al.

[11] Patent Number: 6,033,552
[45] Date of Patent: Mar. 7, 2000

[54] METHOD FOR PURIFICATION OF NATRIUM SULPHATE

[76] Inventors: Aron Mikhailovich Khalemsky, 33-20 Vaiger Street, Pervouralsk, Sverdlovsk region; Andrei Nikolaevich Shmidt, deceased, late of Pervouralsk; Boris Andreivich Pakhomov, __32, Vainer Str., Pervouralsk, Ekaterinburg Region, 624470; Sergei Abramovich Payusov, 118, Lunacharsky Str., Ekaterinburg, 620219, all of Russian Federation

[21] Appl. No.: 09/044,241

[22] Filed: Mar. 19, 1998

[51] Int. Cl.⁷ .............................. C25B 1/00; C25C 1/10; B01D 17/06
[52] U.S. Cl. ..................... 205/483; 205/572; 205/687; 205/771
[58] Field of Search ................... 205/483–485, 205/487, 572, 771, 687

[56] References Cited

U.S. PATENT DOCUMENTS

| | | | |
|---|---|---|---|
| 728,778 | 5/1903 | Specketer | 205/485 |
| 802,205 | 10/1905 | Gibbs | 205/483 |
| 3,755,102 | 8/1973 | Bastacky | 205/771 X |

*Primary Examiner*—Donald R. Valentine
*Attorney, Agent, or Firm*—Michael J. Foycik, Jr.

[57] ABSTRACT

Purification of Natrium Sulfat, separation of chrome by the electrocoagulation of Chrome using a bioelectrode cell (AC). The bioelectrode cell is a series of electrodes (Fe—Cr—Fe—Cr), and AC is applied to the first and the last electrodes.

2 Claims, No Drawings

METHOD FOR PURIFICATION OF NATRIUM SULPHATE

The invention relates to technology of natrium sulphate purification from chrome. The method is carried out by chrome sedimantation by electric coagulation in bi-electrode cell by alternating current. Bi-electrode cell is made of four consecutive alternating metal and aluminium electrodes, thus the current is being applied for two external electrodes. The method provides natrium sulphate purification up to chrome content of 0008%. 1 formula, 1 table.

The invention relates to technology of natrium sulphate purification from chrome.

Natrum sulphate obtained in the process of sulphite restoration of monochrome alkaline solutions contains up to 1% of chrome, thus making $Na_2SO_4$ waste product of multi tons. For transformation of natrium sulphate into commodity product for wide application in industry it is necessary to extract chrome from it.

There are some chemical methods of natrium sulphate clearing by dissolution and over-crystallisation from saturated solutions. However in practical use in industrial manufacturing they are of low effect.

Also known are some methods of different products clearing off chrome by elecric coagulation.

The drawbacks of the methods are the necessity to use powerful rectifiers, thus increasing power consumption and also filling of space between electrodes due to uneven sedimentation of deposits on electrodes of different polarity, resulting in short cuts and production failures for repairs.

The closest for the declared is the method of natrium sulphate clearing off chrome (VI). The method includes chrome dissolution and its restoration sedimentation by solution processing with sulphur containing compounds at 60–100° C. in presence of phosphatines, entering as orthophosphorous acid or its oxides.

The drawback of the method is natrium sulphate fouling with sulphur containing compounds due to necessity of their addition in excess. This lowers the quality of the final product obtained.

The technical task of the invention—is the reduction of energy expenses for clearing, increase of technology level and productivity of the method of obtaining high quality natrium sulphate commodity product, with no content of chrome of any valency.

For this purpose, in the method of natrium sulphate purification, including chrome sedimentation and separation of the obtained sediment, according to the invention, chrome sedimentation is carried out by electric coagulation with the help of bi-electrode cell and use of alternating current with frequency of 50 Hz and voltage of 11–15 V. Bi-clectrode cell is made of four alternating iron and aluminium electrodes, space between which is 10 mm and current is applied for two external electrodes.

While flow of current of constant voltage through iron and aluminium electrodes, the rise of temperature and pH of the initial solution occur and also the conditions for occurrence of oxidising-reconstruction reactions are being formed, resulting in formation of hydro-oxides of the metal—chrome—of different aquacontent depositing while sedimentation.

The use of alternating current provides quick and periodical change of polarity of electrodes, thus resulting in change of metal ions flow direction. Due to that slam film on electrodes doesn't have enough time to grow and is carried away into sediments by iron and aluminium hydro-oxides forming at the same time in the solution. So, hydro-oxides of $Cr(OH)_3+Fe(OH)_3+Al(OH)_3$ are forming in the system and they deposit in sediments at pH=6–7.

The manufacturing of electrodes with different materials—aluminium and iron—makes conditions for the formation of galvanic pair which intensifies the process of sedimentation.

In the electric coagulation method proposed, applied alternating voltage of 11–15V (13,5V recomended) is necessary and sufficient for ensuring reactions on the electrodes.

Owing to manufacturing of the cell of four alternating electrodes the surface of reaction increases with minimal current expense, and processes of sediments formation and sedimentation accelerate as result of larger grains formation.

The space of 10 mm between electrodes in the cell is optimal. While decreasing of this space expences of current increase, and increasing is not reasonable as it prolongs the time for achieving desired degree of cleaning.

The method of natrium sulphate cleaning is performed as follows. Initial raw material—is solid natrium sulphate with chrome content of 0,12%. Natrium sulphate is dissolved in water up to concentration of 150 g/l $Na_2SO_4$, thus pH of initial solution is 6.

Solution is passed to reactor as well as bi-electrode cell, consisting of four electrodes (150 100 $mm^3$ each) made of iron and aluminium. Electrodes are placed in the following sequence: iron-aluminium-iron-aluminium, space between them is changed from 5 to 15 mm (see table).

Alternating current with frequency of 50 Hz is applied for two external electrodes, supporting either constant voltage within interval of 9–15V or power of current within interval of 5–15 A(see table).

TABLE

| I,A, changes | U,V, const | R, mm | t, min | Chrome content in final product, % | pH changes | temperature changes, ° C. | concentration of $SO_2$ in the liquid (g/l) |
|---|---|---|---|---|---|---|---|
| 4,0–5,2 | 9 | 10 | 32 | <0,001 | 6–7 | 18–27 | 150 |
| 5,2–6 | 11 | 10 | 28 | <0,001 | 6–7 | 24–47 | 150 |
| 6–11 | 13 | 10 | 25 | <0,0008 | 6–7 | 30–58 | 150 |
| 11–14 | 15 | 10 | 13 | <0,001 | 6–7 | 20–56 | 150 |
| 5 | 8–13 | 10 | 40 | <0,001 | 6–7 | 19–40 | 150 |
| 7,5 | 9,0–13 | 10 | 32 | <0,001 | 6–7 | 19–56 | 150 |
| 10 | 10–13,5 | 10 | 25 | <0,001 | 6–7 | 20–47 | 150 |
| 12,5 | 12–14 | 10 | 17 | <0,001 | 6–7 | 18–44 | 150 |
| 15 | 14–16 | 10 | 10 | <0,001 | 6–7 | 22–61 | 150 |
| 10–16 | 13,0 | 10 | 11 | <0,001 | 6–7 | 19–56 | 150 |
| 6–11 | 13,0 | 10 | 25 | <0,0008 | 6–7 | 30–58 | 150 |
| 2–4 | 13,0 | 10 | 60 | <0,001 | 6–7 | 19–52 | 150 |

The probes of the solution are taken after different time intervals for measuring chrome content. Process is finished when chrome is not more determined by photo colour metric method. After that the solution is filtrated and final product is crystallised from it. In different experiments this product contains not more than 0,0008% of chrome thus it appears to be commodity product.

The method proposed is technologically simple comparing to the existing methods, and doesn't need sophisticated equipment for its realization. Elimination of constant current significantly simplifies schematic solution, increasing technological level and productive capacity of the process, excluding accidental stops, failures and shortcuts, making production cost cheaper, excluding electrical energy dissipation in rectifiers. The method excludes usage of any reagents, providing best quality of commodity product.

Dependence of t—time of sulphate natrium clearing off chrome (with chrome content in solid sample 0,12% ) from current strength I, difference in potentials on external electrodes U, space between electrodes R is shown in table.

What is claimed is:

1. A method of purification of natrium sulphate from chrome compounds, comprising the steps of:

sedimentation of chrome by electric coagulation in a bi-polar electrolyser using an alternating current of 50 Hz and a voltage in a range of 11–15V, separating sediments obtained in the step of sedimentation of chrome to form a final solution, and crystallizing the final solution.

2. The method of purification of natrium sulphate from chrome compounds according to claim 1, wherein the electrolser has electrodes spaced apart by a distance of 10 mm.

* * * * *